April 11, 1944.    B. J. SCHILL    2,346,459
GRAIN DRILL
Filed March 14, 1941
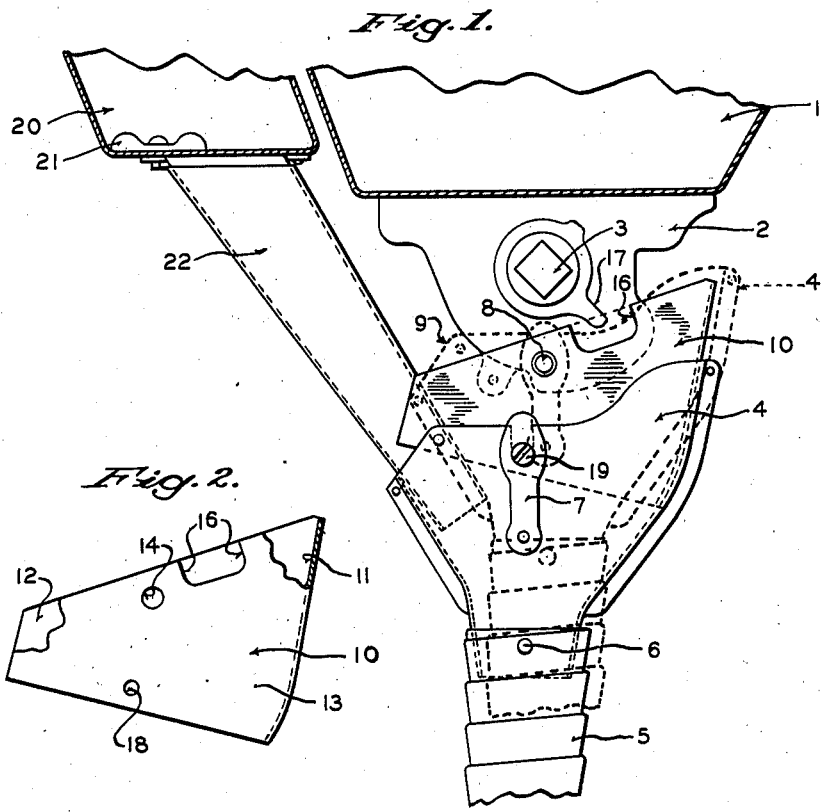
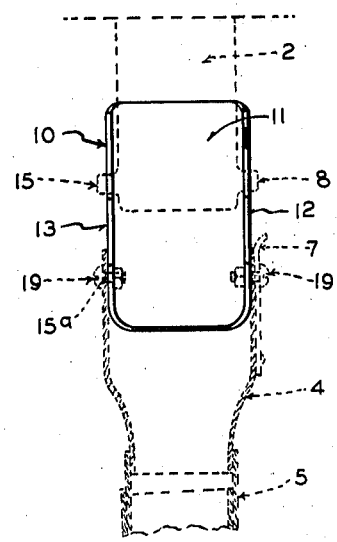
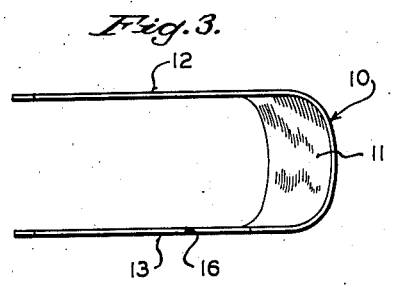
INVENTOR
Bernard J. Schill
BY
Emerson B Donnell
ATTORNEY Patented Apr. 11, 1944

2,346,459

UNITED STATES PATENT OFFICE 2,346,459

GRAIN DRILL

Bernard J. Schill, Rockford, Ill., assignor to J. I. Case Company, Racine, Wis., a corporation Application March 14, 1941, Serial No. 383,266

5 Claims. (Cl. 193—9)

The present invention relates to grain drills or seeding mechanism and an object of the invention is to generally improve the construction and operation of such mechanism.

A further object is to provide an improved adapter for facilitating the placing of fertilizer with the seed.

A further object is to eliminate the necessity for providing a different set of seed tubes with a grain drill for use with a fertilizer attachment than that furnished with a grain drill not having a fertilizer attachment.

A further object is to provide an increase in the opening normally present at the region where the fertilizer spout should enter the seed tube top.

A further object is to increase the slope of the fertilizer spout so as to assist in avoiding clogging.

Further objects and advantages will become apparent from the annexed specification and accompanying drawing in which:

Figure 1 is a side elevation of so much of a grain drill as necessary to show the adapter in position between its associated parts.

Fig. 2 is a side elevation of the adapter alone.

Fig. 3 is a top view of the same.

Fig. 4 is a rear elevation of the same.

As is well-known, a grain drill commonly includes a seed hopper 1, against which are fastened a number of feed cups or elements generally designated as 2 and through which passes an actuating shaft 3 which rotates for metering seed from hopper 1 into a funnel-like tube top 4, the seed dropping through top 4 into a tube 5, commonly made from a spirally wound ribbon of flexible material, and suspended from top 4 by means of one or more studs as 6 or equivalent means. Tube 5 leads to one of a series of openers of well-known type, not shown, which form furrows and deposit the seed therein as the drill proceeds across the field.

Top 4 may be applied to feed cup 2 in the dotted line position shown in Fig. 1 in which case a spring clip 7 engages a stud 8 on said cup 2, and supports the top 4 in position. A similar stud, not shown, may be applied to the back-side of feed cup 2 for more securely supporting top 4. Under these conditions a small clearance or opening exists at 9 between top 4 and feed cup 2. This is ordinarily used for observing the seed dropping from cup 2 as a check on the operation of the feeding mechanism.

Under certain conditions, it is desirable to feed fertilizer along with the seed so that it will be placed in the furrows at the same time. For this purpose, an adapter generally designated as 10 may be used, comprising a substantially U shaped element of suitable material, such for example as sheet metal having a front end portion 11 and side portions 12 and 13 extending rearwardly from portion 11. The parts are of such dimensions as to fit within top portion 4, and side portions 12 and 13 are provided with openings, as 14, for engagement with stud 8 on feed cup 2, and its companion stud 15, as seen in Fig. 4. A notch 16 may be provided for clearing a tongue 17, normally a well-known part of a feed mechanism of this character, although other expedients are contemplated for clearing this element. Sides 12 and 13 are also provided with openings as 18 for the accommodation of bolts or the like as 19 for engaging spring clip 7, and the opposite side of top 4.

The operation of the above described device is thought to be clear from the preceding description, it being noted that grain drills are made and sold in large quantities without fertilizer attachments. Under these conditions adapter 10 is not used and tube top 4 is placed beneath feed cup 2 in the position shown in dotted lines in Fig. 1, opening 15ª in top 4 being engaged with stud 15 and spring clip 7 being engaged with stud 8. When a machine is ordered with the fertilizer attachment on it, the same tube 5 and tops 4 are readily used, adapters as 10 being fitted within the tops 4 of the seed tubes of the drill, as shown in Fig. 1, and fastened in place as by bolts 19, or other suitable fastening means. Adapter 10 may then be sprung apart sufficiently to snap over studs 8 and 15 whereupon they will support the adapter, and, through bolts 19, tube 5 and top 4.

A drill ordered with fertilizer attachments will have a fertilizer hopper 20, some sort of metering means of well-known construction indicated as 21, and a spout 22. Spout 22 may rest in the portion of top 4 which would ordinarily contain opening 9, but which has been moved downwardly and rearwardly by the interposition of adapter 10, as will be apparent from Fig. 1. This results in substantially more room between the rearmost portion of top 4 and the rear underside of feed cup 2. There is, therefore, ample room for spout 22 to discharge its fertilizer into the tube top 4 along with the seeds and, furthermore, the rearward displacement of top 4 results in a steeper slope of spout 22 than would be the case if it were attempted to enter the spout into opening 9 without adapter 10.

Adapter 10 therefore, makes it unnecessary to supply entirely different tops 4 or a duplicate set of tubes 5, commonly supplied in the past where drills were adapted for fertilizer attachments.

The above being a complete description of an illustrative embodiment of the invention, what is claimed as new and desired to be secured by Letters Patent of the United States is:

1. An adapter for a grain tube on a grain drill comprising a substantially U shaped element having a forward panel, sides, and an open back, said element including stud engaging means on the sides thereof for the support of said adapter, said sides being adapted to spring to clear the studs, and means spaced from said stud engaging means for supporting a grain tube top.

2. An adapter for a grain tube on a grain drill comprising substantially a U shaped element having a forward panel, sides, and an open back, said element including stud engaging means on the sides thereof for the support of said adapter, and said sides being adapted to spring to clear the studs, and said adapter being provided with means for supporting said grain tube in a displaced position.

3. An adapter for a grain tube on a grain drill, said tube having a top for receiving grain and providing an opening between itself and the feed cup of a grain drill, said adapter comprising a substantially U shaped element having a forward panel, sides, and an open back, said element including stud engaging means on the sides thereof for the support of said adapter, and said sides having means so spaced from the stud engaging means as to support said tube top with said opening forming a continuation of said open back, to provide an increased opening for reception of fertilizer to mix with the grain in said tube.

4. In a grain drill having a seed hopper and a feed cup associated with the hopper, the grain drill being adapted for the reception of a fertilizer hopper, fertilizer feeding means and a spout for conducting fertilizer from the feeding means, the combination of a grain tube, a tube top on the grain tube and adapted to fit about said feed cup and be supported therefrom and to provide an opening between itself and the feed cup for observation of seed being dropped, said tube top being adapted to receive seed from said feed cup for delivery to said grain tube, and an adapter constituted to be interposed between said feed cup and said tube top and including a front panel, sides and an open back, means for supporting said adapter from said feed cup, said adapter having means for supporting said tube top, and said adapter being so proportioned as to support said tube top in a displaced position with said opening forming a continuation of said open back for continued reception of seed from said feed cup and also for reception of said spout in said opening, for introduction of seeds and fertilizer into said tube top.

5. An adapter for a grain tube having a top so shaped and proportioned as to substantially enclose a feed cup on a grain drill, and to provide an opening for observation of seed being dropped by said feed cup into said top, and comprising a substantially U shaped element having a forward panel, sides, and an open back, said element including feed cup engaging means on the sides thereof for the support of said adapter, and said sides having means for supporting said tube top and so spaced from the adapter supporting means as to locate said tube top with said feed opening dropped below its normal position, and with said opening forming a continuation of said open back of said adapter to provide space for the accommodation of a fertilizer spout in the opening to feed into the tube top beside the feed cup.

BERNARD J. SCHILL.